Patented Feb. 19, 1929.

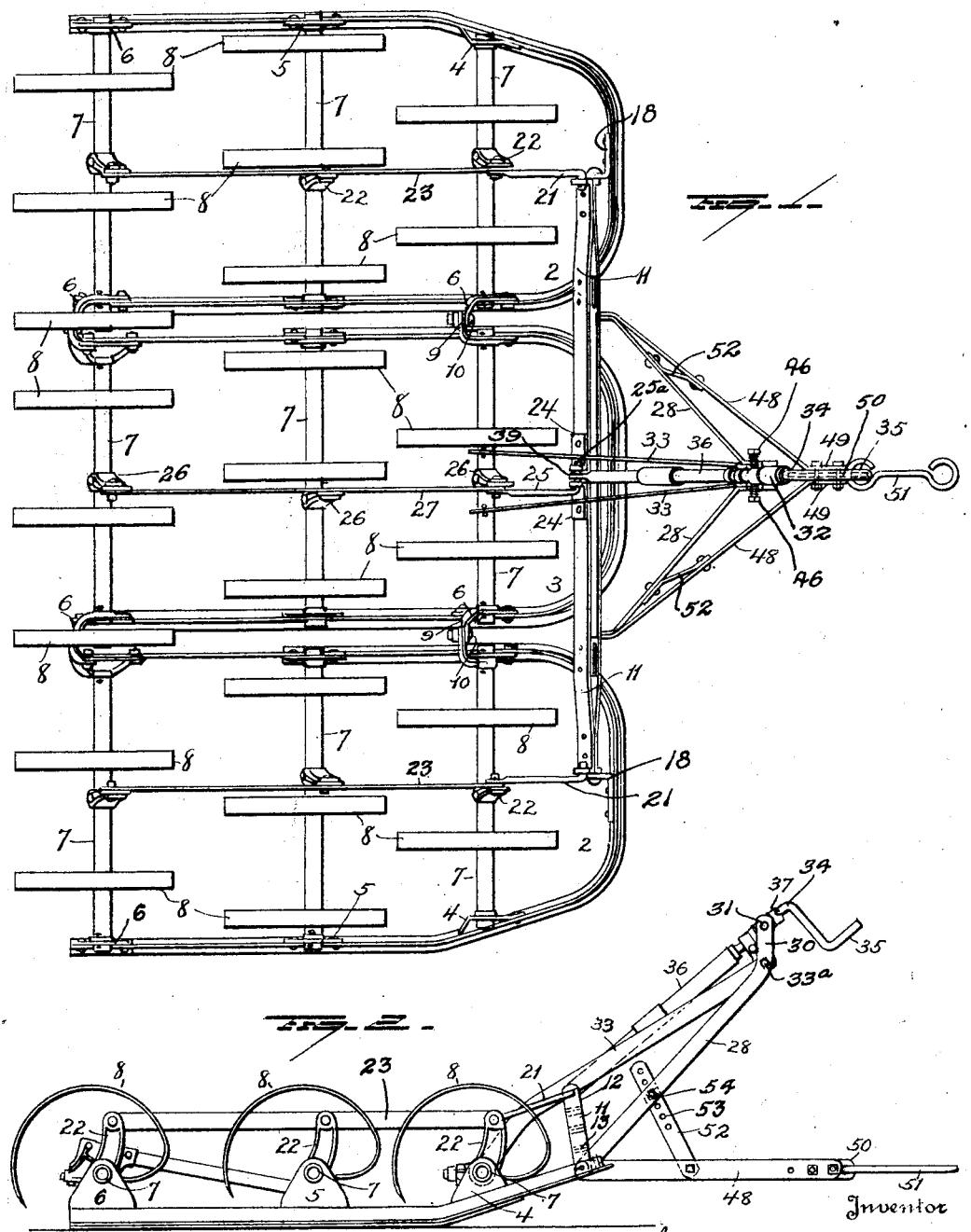

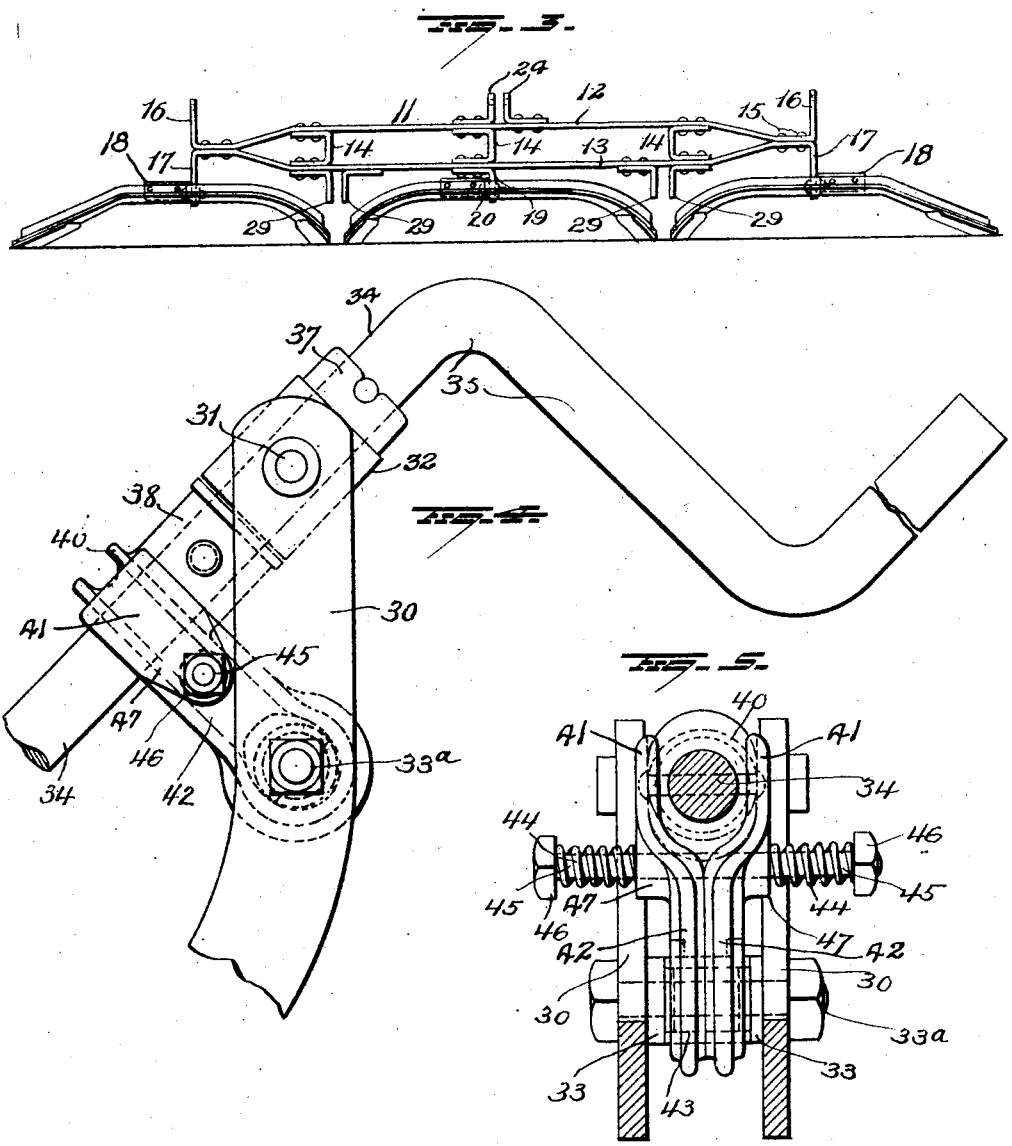

1,703,051

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

HARROW.

Application filed December 11, 1924. Serial No. 755,236.

This invention relates to improvements in harrows and more particularly to that of the spring-tooth type,—one object of the invention being to provide simple and efficient manually operable means for manipulating the spring teeth in raising or lowering the same; to so construct and arrange such means that the use of hand levers shall be obviated and so that the central member shall be located within convenient reach of an operator riding on a tractor, and to so construct the manually operable means and connect the same with the harrow teeth carrying members that the teeth of all the units of a multiple-unit harrow may be manipulated simultaneously by a single manually operable control member.

A further object is to so construct a multiple-unit harrow that the cross bar, through the medium of which the teeth of the several units are adjusted or manipulated, shall have direct connection with each of the several units, whereby such rigidity of the front portion of the harrow shall be obtained as to enhance the effectual breaking up of hard lumps of earth and the leveling of high spots, and it is a further object to make the units or sections of comparatively light and flexible material, so that the rear end of the harrow shall be quite flexible.

With these and other objects in view, the invention consists in certain novel features of construction and combinations of parts as hereinafter set forth and pointed out in the claims.

In the accompanying drawings;

Figure 1 is a plan view of a spring tooth harrow embodying my improvements;

Figure 2 is a side view;

Figure 3 is a detail view showing the rocking cross bar or beam and its connection with the frames of the harrow units or sections, and Figures 4 and 5 are enlarged detail views illustrating the clutch means for the operating or control screw of the harrow teeth manipulating means.

In the embodiment of the invention illustrated in the drawings, the harrow is shown as comprising two side units or sections 2, 2, and an intermediate unit or section 3. Bearing brackets 4, 5, and 6 are secured to the frames of the several units for the accommodation of transverse rock-shafts 37 to which spring harrow teeth 8 are suitably secured. The front and rear brackets 6 on the intermediate unit frame and the brackets 6 on the inner parts of the side unit frames are provided with lateral ears 9 and the ears 9 on the brackets 6 of the side unit frames are pivotally connected by horizontal pivots 10 with the ears 9 of brackets 6 on the intermediate unit frame, and thus the several unit frames are spaced apart and connected by horizontal pivots.

Near the forward end of the harrow, a transverse, rocking cross bar or beam 11 is located. This cross bar or beam preferably comprises two members 12 and 13, spaced apart throughout the major portion of their lengths by angle spacers or braces 14. At respective ends of the bar or beam 11, the members 12, 13, thereof are brought together and riveted as at 15,—the extremities of said members being bent to form arms or brackets 16 projecting upwardly from the member 12 and arms or brackets 17 projecting downwardly from the member 13. The depending arms or brackets 17 are pivotally connected with brackets 18 rigidly secured to the forward ends of the frames of units 2, 2, and an arm or bracket 19 is secured to and depends from an intermediate portion of the bar or beam 11 and is pivotally connected with an arm or bracket 20 fixed to the frame of the intermediate unit 3. Thus the bar or beam 11 is connected directly with the frames of the several units and is so mounted as to be capable of being rocked.

The arms or brackets 16 projecting upwardly from the upper member 12 of the rocking bar or beam 11 are connected by links 21 with arms 22 secured to the forward shafts 7, 7, of the side units 2, 2 of the harrow, and said arms are connected, by rods 23 with similar arms on the other shafts 7 of these units. Spaced brackets 24—24 are secured upon the intermediate portion of the upper member 12 of the rocking bar or beam and are connected by a link 25 with an arm 26 on the forward shaft 7 of the intermediate unit 3,—said arm 26 being connected, by a rod 27, with similar arms on the other shafts of this unit. The pivotal connection of the forward end of the link 25 with the spaced brackets 24 on the rocking bar or beam may conveniently be effected by bending the forward portion of said link laterally to provide a pivot pin 25ª which passes through both of said brackets 24.

From the construction and arrangement of parts above described, it is apparent that if the transverse forward bar or beam 11 be rocked in one direction, the shafts 7 of all the units will be turned in a direction to cause the raising of all the spring teeth of the harrow and that if said bar or beam be rocked in the other direction, the teeth may be lowered to the desired extent so that they may be made to assume the most efficient working positions, according to the condition of the ground being harrowed. Provision is made however, (as hereinafter described) to so adjust the structure with respect to the draft tractor, that the relative depth of penetration of the forward and rear teeth may be controlled.

Inclined bars or standards 28 are hinged or pivotally connected at their lower ends with the transverse bar or beam 11 through the medium of arms or brackets 29 secured to and depending from the lower member 13 of said bar or beam,—the pivotal connections between said bars or standards and the rocking bar or beam being approximately in horizontal alignment with the pivotal connections between said rocking bar or beam and the frames of the harrow units. From their connection with the rocking bar or beam 11, the bars or standards 28 project forwardly and upwardly and also inwardly toward each other, so that their upper, approximately vertical portions 30 will be suitably spaced apart to receive and provide a pivot mounting 31 for a sleeve 32. To properly support the bars or standards 28, braces 33 are provided, the upper forward ends of the latter being attached by a bolt 33ª to the upper portions of said bars or standards and the rear lower portions being loosely connected with the forward tooth shaft 7 of the intermediate unit, the loose connection being such as not to interfere with the proper turning of said shaft.

A screw shaft 34 (having a hand crank or manually operable part 35 at its free end) extends freely through the pivotal sleeve 32 and enters a tube 36, the latter being adapted interiorly to cooperate with the thread of the screw shaft, which thread is enclosed within the tube. Longitudinal movement of the screw shaft may be prevented by members 37 and 38 applied to said shaft above and below the sleeve 32. The rear lower end of the tube 36 of the screw mechanism is provided with a projection 39 which enters between the spaced brackets 24, 24 on the upper member 12 of the rocking bar or beam 11 and is connected therewith by the pivot pin 25ª at the forward end of the link 25. Thus the tubular member 36 of the screw mechanism is operatively connected with an intermediate portion of the rocking bar or beam.

I do not in this case, claim the specific construction of the screw shaft and tube devices above described, the same constituting the subject-matter of a copending application filed February 2, 1924, by Ernest W. Richards and Ernest J. Janso, and designated by Serial No. 690,292, now Patent No. 1,618,677.

It is apparent that when the screw shaft is turned by the operator, motion will be imparted, through the tube 36 to the rocking bar or beam 11, and the shafts 7 of the several harrow units will be turned to raise or lower the harrow teeth as previously explained. Thus, all the teeth of the harrow may be manipulated by the normal operation of a single screw mechanism, the control or handle portion of which may be disposed within convenient reach of an operator seated on a tractor, and the use of lever mechanism for manipulating the teeth of each unit is obviated, while the amount of power necessary to manipulate the harrow teeth will be minimized.

The screw mechanism which I prefer to employ is of the ball-bearing type such for example, as that disclosed in the pending application hereinbefore identified, and it is desirable that means be provided to guard against accidental turning of the manually operable screw shaft of said mechanism when the harrow is being transported over rough ground. This may be accomplished by means of the clutch devices shown in detail in Figs. 4 and 5 of the drawings.

The member 38 secured to the screw shaft 34 may be made in the form of a tubular casting and a portion 40 thereof may have an oval or elliptical contour exteriorly to provide a wearing surface for two friction clutch jaws 41, 41 disposed at respective sides of said portion 40. The jaws 41 are formed at the upper ends of plates 42 which constitute shanks for said jaws and these plates or shanks are loosely mounted near their lower ends upon a spacer tube 43 on the bolt 33ª. Springs 44 are employed to press the jaws toward the portion 40 of the member or casting 38 and these springs are mounted on a bolt 45 with their outer ends bearing against nuts 46, on said bolt, and their inner ends seated against shoulders 47 on the clutch members.

Heretofore, with spring tooth harrows having a low hitch connection with a tractor, there has been a tendency for the harrow to run on the nose which means that the front teeth will enter the ground too much while the rear teeth will not penetrate the ground enough if at all. To overcome such objectionable operation of a spring tooth harrow, the draft devices will have rigid connection with the cross bar or beam of the structure, but provision is made to permit vertical adjustment so that the depth of penetration of the front and rear teeth relatively to each other can be controlled. To these ends, draft bars 48 are attached to the cross bar or beam 11 at the arms or brackets 29 and, converging forwardly, terminate in parallel portions 49 between which a draw bar block 50 is adjustably bolted. This block is connected with a tractor through the medium of a draft link 51. Braces 52 are pivoted to the draw bars 48 and connect the latter with the bars 28 in a manner to support the draw bars in rigid positions. The braces are provided with series of holes 53 for the accommodation of connecting bolts 54 so that the connection of the braces 52 with the bars 28 may be adjusted to adjust the draw bars in vertical planes.

By means of the draw-bar arrangement above described, the harrow can be caused to work "on an even keel," and the front spring teeth can be caused to penetrate the ground to greater depth than the depth of penetration of the rear teeth by setting the front end of the draw bars high, or the front ends of the draw bars may be set low and thus cause the rear teeth to do more work than the front ones. In other words, either a down pressure can be brought to bear on the front end of the harrow by setting the front ends of the draw-bars high, or an up-pull may be effected by setting the front ends of the draw-bars low, and furthermore, the harrow will be prevented from running on the nose.

Various slight changes might be made in the details of construction of the invention without departing from the spirit of the latter or limiting its scope and hence I do not restrict myself to the precise details herein set forth.

Having fully described my invention what I claim as new and desire to secure by Letters-Patent, is:—

1. In a harrow, the combination with a frame member, rock shafts mounted therein, and harrow teeth carried by said rock shafts, of manually operable screw mechanism including a member operatively connected with said rock-shafts, and forwardly projecting means for supporting said screw mechanism on the harrow.

2. In a harrow, the combination with a frame member, rock-shafts mounted therein, harrow teeth carried by the rock-shafts, and a rocking bar mounted on and extending over said frame member and operatively connected with the rock-shafts, of manually operable screw mechanism, said screw mechanism including a member operatively connected with said rocking bar and a rotatable member, and means for supporting said members beyond the frame member.

3. In a harrow, the combination with a frame member, rock-shafts mounted therein, harrow teeth carried by the rock-shafts, and a rocking bar associated with said frame member and operatively connected with the rock-shafts, of manually operable screw mechanism, said screw mechanism including a member operatively connected with said rocking bar and a rotatable member, a friction clutch for preventing accidental turning of rotatable member of said screw mechanism, and means for supporting said members.

4. In a harrow, the combination with a plurality of pivotally connected units, each unit including a plurality of rock-shafts and a plurality of harrow teeth carried by each rock shaft, of a manually operable screw mechanism, means connecting one member of said screw mechanism with the rock-shafts of the several units, and means projecting upwardly and forwardly for supporting said screw mechanism in position to be operated from a towing tractor.

5. In a harrow, the combination with a plurality of pivotally connected harrow units, each including a plurality of rock shafts and harrow teeth carried by said rock shafts, of a rocking bar associated with the several units and operatively connected with the rock-shafts thereof, of standards extending forwardly, upwardly and inwardly from said rocking bar, braces extending from one of said harrow units to said standards manually operable screw mechanism including a member connected with said rocking bar and a rotatable member, and a mounting for the rotatable screw member, said mounting having pivotal support between the forward portions of said forwardly, upwardly and inwardly extending standards.

6. In a harrow, the combination of a plurality of harrow units arranged side by side and pivotally connected together, each unit including a plurality of rock-shafts and harrow teeth carried thereby, means operatively connecting said rock-shafts, a rocking bar comprising two members spaced apart intermediate of their ends and secured together near their ends, braces between said members, the ends of said members being bent upwardly and downwardly respectively to provide attaching arms, and other attaching arms secured to the bar members and projecting upwardly and downwardly therefrom respectively, operative connections between said upturned attaching arms of the rocking bar and one rock shaft of each unit, the downturned attaching arms being pivoted to the respective frame units, and means connected with one upturned attaching arm for rocking said rocking bar.

7. In a harrow, the combination with a frame member, harrow teeth mounted therein, a rocking bar mounted transversely on the frame member and operatively connected with said teeth to raise and lower them, and means operable normally to hold said rocking bar against rocking, of draft bars connected with said rocking bar, members extending from the rocking bar to support the means to hold the rocking bar against rocking, and means connected with said members for holding said draft bars fixed at different positions of vertical adjustment.

8. In a harrow, the combination with a plurality of pivotally connected harrow units, each including a plurality of rock-shafts and harrow teeth carried by said rock-shafts, and means operatively connecting said rock-shafts, of a rocking bar pivotally connected with said units and operatively connected with one rock shaft of each unit, inclined standards extending forwardly from said rocking bar, braces for said inclined standards, screw mechanism having one of its members supported by said inclined standards and having another of its members connected with said rocking bar, draft bars connected with said rocking bar, and braces pivoted to said draft bars and adjustably connected with said inclined standards to support the draft bars fixed at different positions of vertical adjustment.

In testimony whereof, I have signed this specification.

HERMAN E. ALTGELT.